Sept. 21, 1971 E. FALCH ETAL 3,606,937

BRAKE DISK ASSEMBLY FOR RAILWAY VEHICLE WHEELS

Filed Aug. 19, 1969 4 Sheets-Sheet 1

INVENTORS
EBERHARD FALCH
FRANZ PRAHL

Edmund M Jaskiewicz
ATTORNEY

BRAKE DISK ASSEMBLY FOR RAILWAY VEHICLE WHEELS

Filed Aug. 19, 1969

INVENTORS
EBERHARD FALCH
FRANZ PRAHL

Edmund M. Jaskiewicz
ATTORNEY

BRAKE DISK ASSEMBLY FOR RAILWAY VEHICLE WHEELS
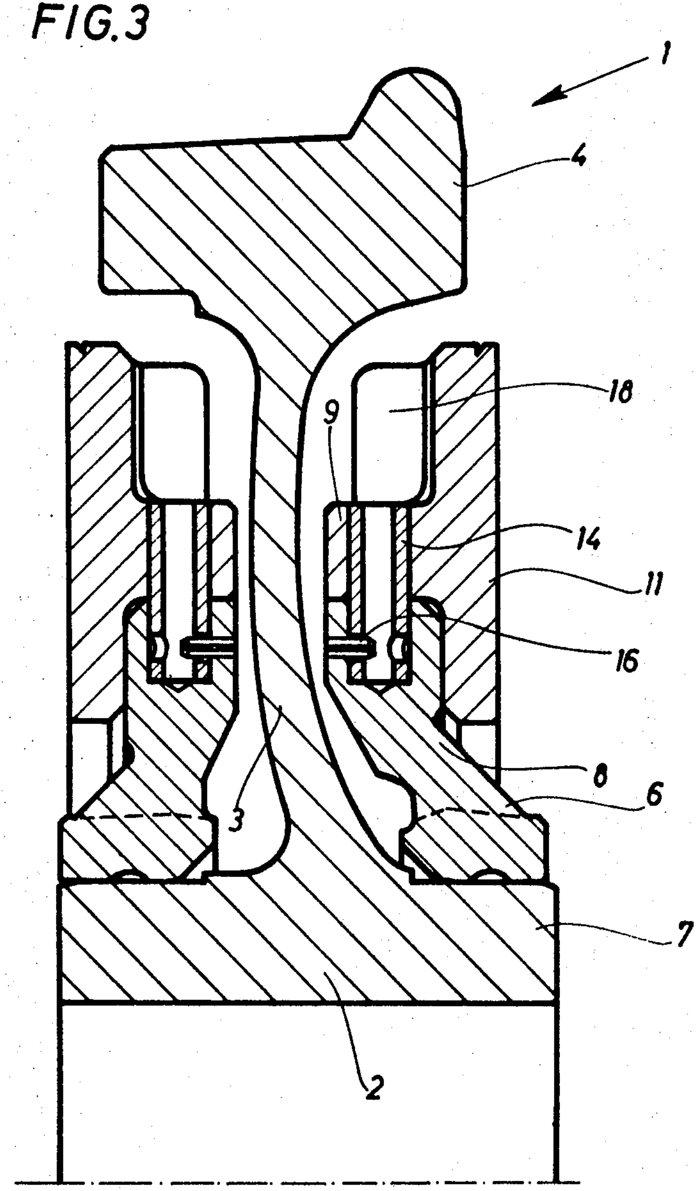
INVENTORS
EBERHARD FALCH
FRANZ PRAHL
Edmund M. Jaskiewicz
ATTORNEY BRAKE DISK ASSEMBLY FOR RAILWAY VEHICLE WHEELS
Filed Aug. 19, 1969 4 Sheets-Sheet 4
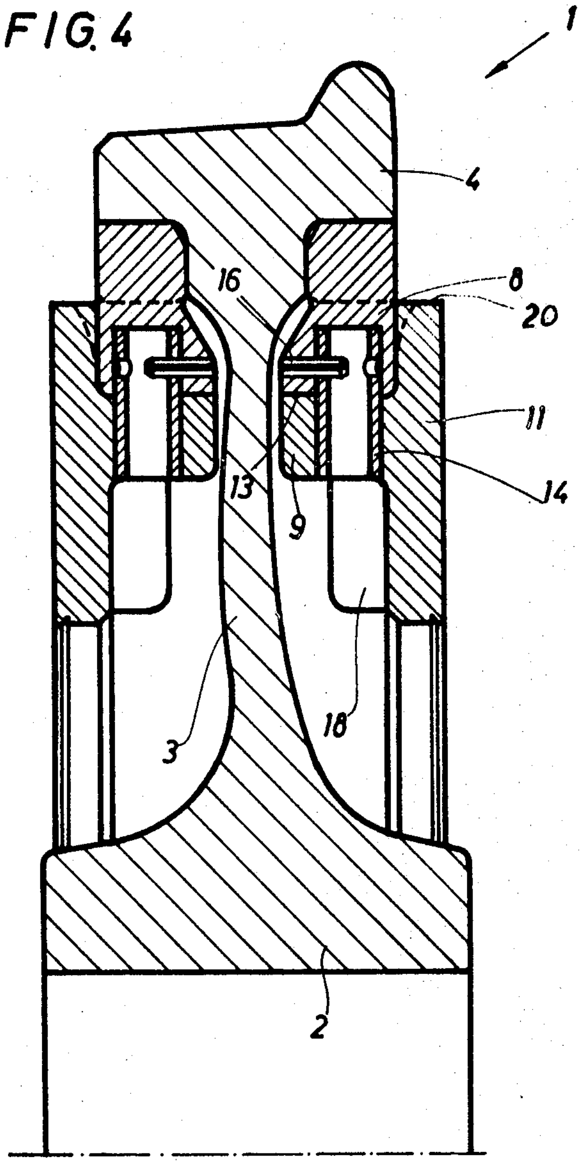
INVENTORS
EBERHARD FALCH
FRANZ PRAHL
Edmund M. Jaskiewicz
ATTORNEY United States Patent Office 3,606,937

Patented Sept. 21, 1971

1

3,606,937

BRAKE DISK ASSEMBLY FOR RAILWAY VEHICLE WHEELS

Eberhard Falch and Franz Prahl, Munich, Germany, assignors to Knorr-Bremse GmbH, Munich, Germany Filed Aug. 19, 1969, Ser. No. 851,192
Claims priority, application Germany, Aug. 20, 1968, P 17 80 246.9
Int. Cl. F16d *65/12*
U.S. Cl. 188—218XL 4 Claims

ABSTRACT OF THE DISCLOSURE

A brake disk is mounted upon a railway wheel by means of an intermediate ring which may be positioned upon either the hub or within the rim of the wheel. The intermediate ring has a plurality of radially extending arms the ends of which support lugs extending from the surface of the brake disk toward the wheel disk portion of the wheel. Tubular clamping sleeves pass radially through bores in the lugs into the arms and are retained in place by retainer pins extending parallel to the rotary axis of the wheel.

The present invention relates to brake disks for railway wheels, more particularly, to mounting of the brake disk upon the wheel by means of an intermediate ring.

Railway vehicle wheels have been previously constructed with at least one brake disk axially spaced from the wheel disk portion of the wheel so as to be engaged by brake shoes moving axially with respect to the wheel during the braking process. The brake disk is generally connected by means of radially extending follower pins to an intermediate ring which in turn is mounted upon the railway wheel. The intermediate ring is generally located in a space almost completely enclosed by the brake disk and the follower pins which may be in the form of tubular clamping sleeves engage the brake disk at its inner peripheral edge. This general arrangement has the disadvantage that the braking forces exerted by the brake shoes in an axial direction against the brake disk produce relatively high bending stresses in the brake disk. In an attempt to reduce such bending stresses it has been proposed to support the brake disk axially at its outer peripheral edge against the wheel rim. This proposed arrangement had the disadvantage that the axial and radial deformations produced in the wheel during movement of the railway vehicle are transmitted to the brake disk with detrimental effects in the brake disk. In addition, the proposed arrangement required maintaining narrow tolerances during the manufacture of such brake disks having plural supporting areas against the wheel.

It has also been proposed to mount the intermediate ring on the hub or rim of the wheel so as to extend behind the brake disk and then bond the ring to the disk at approximately its central diameter. However, it has been found that such intermediate ring construction is inadequate for absorbing the axial loads to which the brake disks are subjected during braking.

It is therefore the principal object of the present invention to provide a novel and improved brake disk assembly for railway vehicle wheels.

It is another object of the present invention to provide a railway wheel brake disk which requires a minimum amount of space for mounting, can be readily manufactured with ordinary tolerances and does not require perforation of the disk portion of the wheel for assembly.

It is a further object of the present invention to provide a railway wheel brake disk which is not subjected to elastic deformations of the wheel and which is subjected to relatively low bending moments.

2

The disadvantages of the prior art as described above are eliminated and objects as set forth above are attained by the present invention. In one aspect of the present invention a brake disk is spaced axially from the wheel disk portion of a railway wheel and mounted upon an intermediate ring positioned upon the wheel and having a plurality of radial arms extending into the space between the brake disk and wheel disk portions. These radial arms extend to approximately the central diameter of the brake disk. The side of the brake disk toward the wheel disk portion is provided with a corresponding plurality of lugs which rest upon the outer ends of the radial arms and are secured thereto by follower pins passing radially through bores in the lugs into the arms. The follower pins are maintained against radial displacement by retainer pins passing through the follower pins and arms parallel to the rotary axis of the wheel. The brake disk has a supporting surface which extends radially from a peripheral edge thereof to its lugs with its supporting surface being in contact against the intermediate ring arms. In addition, the outer ends of the intermediate ring arms and adjoining surfaces of the lugs define a cylinder concentric with the rotary axis of the wheel. The follower pins passing through the brake disk lugs into the arms on the intermediate ring may comprise tubular clamping sleeves.

Other objects and advantages of the present invention will be apparent upon reference to the accompanying description when taken in conjunction with the following drawings, which are exemplary, wherein;

FIG. 3 is a view similar to that of FIG. 1 of a modification of the present invention; and FIG. 4 is a view similar to that of FIG. 1 and showing a still further modification of the present invention.

Proceeding next to the drawings wherein like reference symbols indicate the same parts throughout the various views, a specific embodiment and modification of the present invention will be described in detail.

Figure 1:
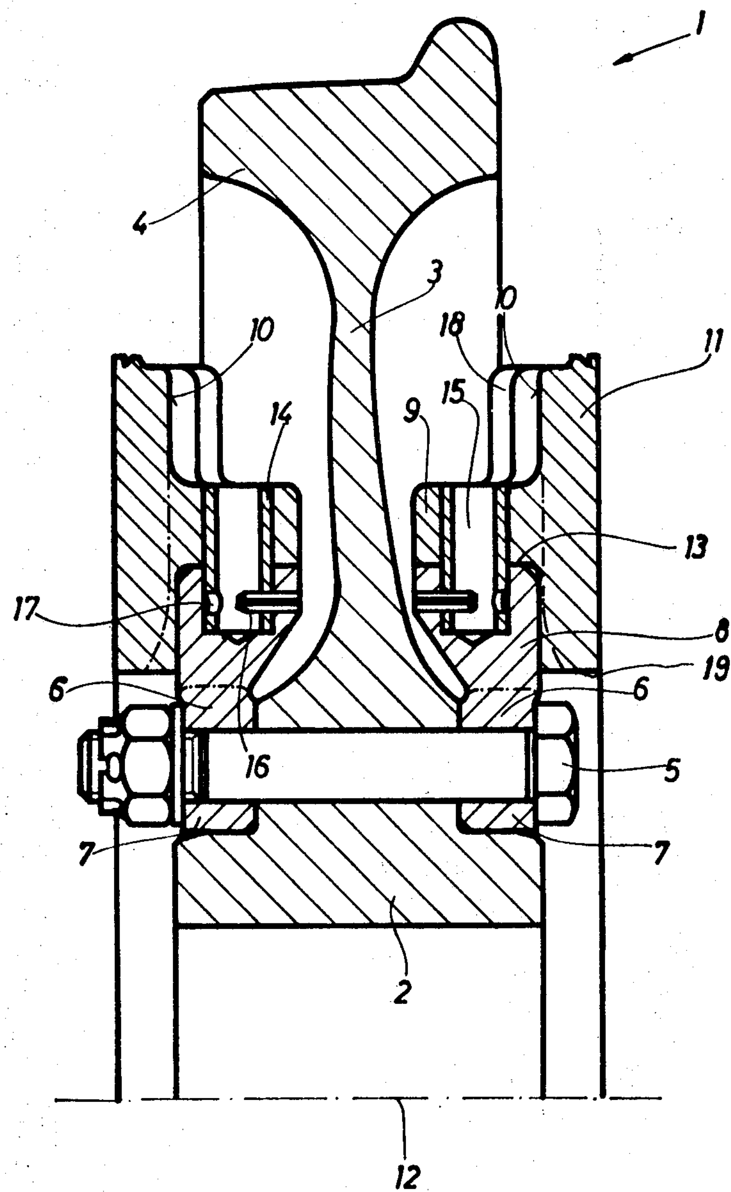
FIG. 1 is a central longitudinal view of a half of a brake disk assembly upon a railway wheel according to the present invention.
Figure 2:
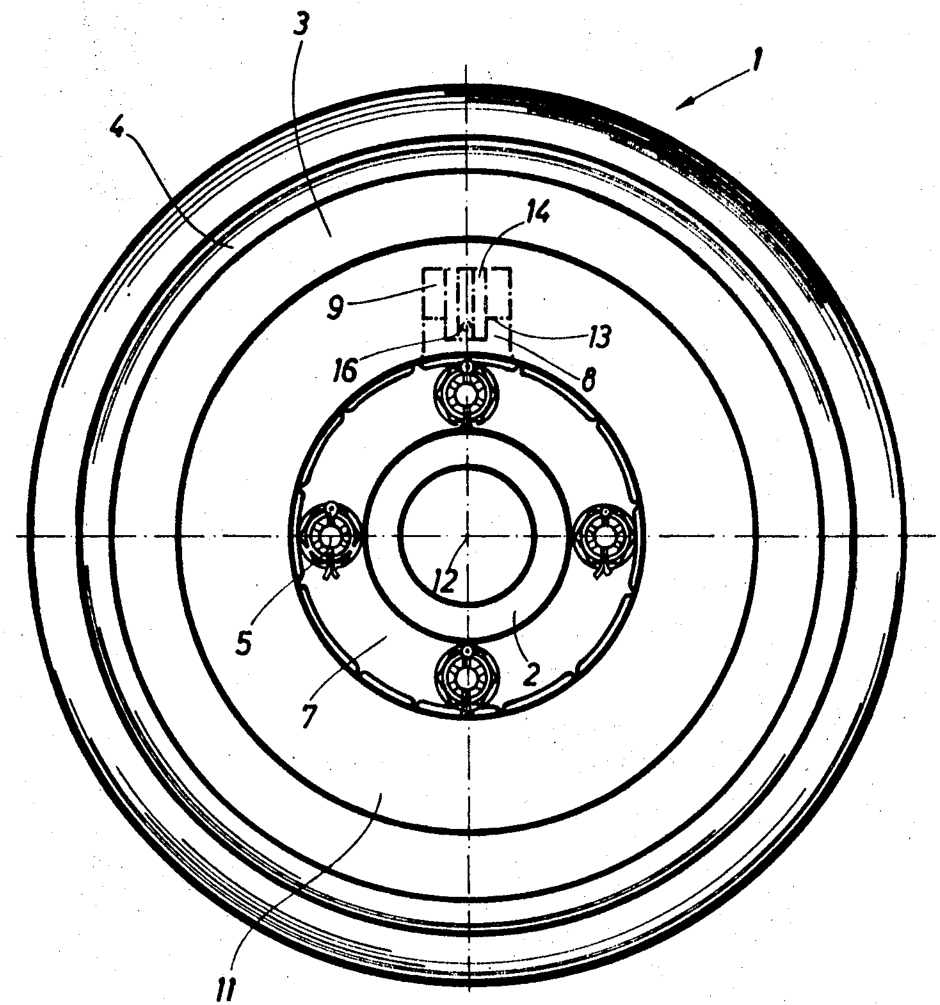
FIG. 2 is an elevational view of the railway wheel and brake disk assembly of FIG. 1.

In FIG. 1 there is indicated generally at 1 a railway vehicle wheel having a hub 2 from which extends radially a wheel disk portion 3 at the outer edge of which is a rim 4. A pair of intermediate rings 6 are mounted upon the hub 2 by bolts 5, which pass through an annular portion 7 on each intermediate ring 6. Each intermediate ring is further provided with a plurality of arms 8, which extend radially outwardly therefrom. The outer ends of arms 8 support lugs 9, which extend from surfaces 10 of brake disks 11. The brake disk surfaces 10 are directed toward the wheel disk portion 3. The two brake disks 11 are arranged on both sides of the wheel 1 by means of the intermediate rings 6. The boundary or contacting surfaces on the outer ends of the intermediate ring arms 8 and brake disk lugs 9 define a cylinder 13, which is concentric with the wheel rotary axis indicated at 12.

Clamping sleeves 14 extend radially into the arms 8 through radially extending bores 15 formed in the lugs 9. The sleeves are retained in position by a plurality of transverse pins 16 inserted into the arms 8 from the sides thereof directed toward the wheel disk portion 3. The transverse pins 16 are inserted into bores 17 through the clamping sleeves 14 and are parallel with the rotary axis 12 of the wheel.

The lugs 9 are mounted at approximately the center of each braking disk 11 so that each braking disk has approximately equal portions extending beyond its lugs 9 in both inward and outward radial directions. Each face 10 of a brake disk is provided with a supporting surface extending radially from the inner peripheral edge 19 of the brake disk to the lugs 9. This brake disk supporting surface contacts the adjoining surfaces of the radial arms 8 as may be seen in FIG. 1.

The side of each brake disk 11 facing the wheel disk portion 3 is provided with a plurality of ventilation vanes or blades 18 which are known in the art.

This mounting of the brake disk 11 upon the intermediate ring 6 provides for axial contact of the brake disk with the arms 8 in the area of the central portion of the brake disks and thus provides for a favorable transmission of forces during the braking operation when the brake shoes exert axial forces against the brake disks. These axial forces exerted by the brake shoes generate only moderate bending stresses in the brake disks. Upon heating of the brake disks from braking operations, the disks together with their lugs are free to expand with only a small relative displacement with respect to the clamping sleeves 14. Since the bores in lugs 9 and arms 8 for receiving the clamping sleeves 14 can be machined concurrently to the required dimensions, it is possible to overcome the usual difficulties encountered in tolerances during the manufacture of brake disks. Any relative movement between the hub 2 and the rim 4 resulting from elastic deformations of the wheel disk portion 3 does not exert any stress on the brake disks 11.

While the invention has been described and illustrated with respect to FIG. 1 as having brake disks on both sides of the wheel, the present invention can also be utilized employing only a single intermediate ring and brake disk on one side of the wheel.

In the modification of FIG. 3, the intermediate ring 6 together with its annular portion 7 may be mounted on the wheel hub 2 by means of a shrink fit. This shrink fit assembly eliminates the bores in the hub 2 to receive the bolts 5 which were employed in FIG. 1. In the modification of FIG. 3, the intermediate rings may be nearer the wheel risk portion 3 so as to significantly reduce the axial dimension of a pair of assembled brake disks. The remaining structure of the modification of FIG. 3 is similar to that shown in FIG. 1.

In the modification of FIG. 4, the intermediate rings 6 are attached to the inner peripheral surface of the wheel rim 4 instead of to the hub 2 as previously described. In a similar manner, arms 8 are also radially disposed but extend inwardly toward the rotary axis of the wheel into the space behind the brake disks 11. The axial support of the brake disks 11 against the arms 8 occurs along a radial supporting surface of brake disk 11 which extends from the outer peripheral edge 20 of the brake disk to the lugs 9. The remaining structure of this modification is the same as that described for FIG. 1.

Thus it can be seen that the present invention has disclosed a brake disk assembly for railway vehicle wheels which is subjected to a minimum of bending and axial stresses but which is relatively simple to manufacture and assemble. The axial support provided by the intermediate ring radial arms against the radial surface of the brake disk produces a favorable distribution throughout the assembly of the axial forces to which the brake disk is subjected during the braking operation. Further, the mounting of the brake disks is independent of the wheel disk portion of the wheel so that any relative movement between the wheel hub and rim produces no corresponding stresses in the brake disk assembly.

It will be understood that this invention is subject to modification in order to adapt it to different usages and conditions.

What is claimed is:

1. A brake disk assembly for a railway wheel comprising a brake disk spaced axially from the wheel disk portion of a railway wheel, an intermediate ring mounted on said wheel, a plurality of radial arms on said intermediate ring disposed between said brake disk and wheel disk portion and extending to about the center of said brake disk, a plurality of lugs extending from about the center of said brake disk on the side thereof towards said wheel disk portion, there being a radial bore in each of said lugs, follower pins passing radially through said lug bores into said arms, and a supporting surface on said brake disk extending radially from a peripheral edge thereof to the lugs with said surface being in contact against said arms, said lugs being supported upon the outer ends of said arms, the outer ends of said arms and adjoining surfaces of said lugs defining a cylinder concentric with the rotary axis of the wheel.

2. A brake disk assembly as claimed in claim 1 wherein said follower pins comprise tubular clamping sleeves, and retainer pins passing through said sleeves and arms parallel to the rotary axis of the wheel to secure said sleeves against radial displacement.

3. A brake disk assembly as claimed in claim 1 wherein said intermediate ring is mounted on the hub of the railway wheel.

4. A brake disk assembly as claimed in claim 1 wherein said intermediate ring is mounted within the rim of said railway wheel.

References Cited

FOREIGN PATENTS

| | | | |
|---|---|---|---|
| 1,311,816 | 11/1962 | France ------ | 188—218(Axial) |
| 1,151,276 | 7/1963 | Germany ---- | 188—218(Axial) |
| 186,827 | 12/1963 | Sweden ------ | 188—218(Axial) |

GEORGE E. A. HALVOSA, Primary Examiner